United States Patent [19]
Johannes, deceased et al.

[11] 3,750,417

[45] Aug. 7, 1973

[54] METHOD OF GENERATION OF FRIGORIFIC ENERGY AND A REFRIGERATOR UTILIZING SAID METHOD

[75] Inventors: Conrad Johannes, deceased, late of Meylan, by Marie Jose Johannes, Administratrix; Emile Carbonell, Grenoble; Pierre Sauty, Bagnolet; Maurice Grenier, Paris, all of France

[73] Assignee: L'Air Liquide, Societe Anonyme Pour L'Etude Et L'Exploitation Des Procedes, Paris, France

[22] Filed: Feb. 24, 1972

[21] Appl. No.: 228,841

[30] Foreign Application Priority Data
Feb. 26, 1971 France .............................. 7106623

[52] U.S. Cl. .......................... 62/114, 62/13, 62/23, 62/40, 62/115, 62/467, 62/502
[51] Int. Cl. ................................................ F25b 1/00
[58] Field of Search .................... 62/114, 115, 467, 62/502, 12, 13, 23, 40

[56] References Cited
UNITED STATES PATENTS

| | | | |
|---|---|---|---|
| 3,413,814 | 12/1968 | Van Geuns | 62/6 X |
| 3,578,073 | 5/1971 | Bosquain | 62/114 UX |
| 3,633,373 | 1/1972 | Carbonell | 62/467 X |

Primary Examiner—William F. O'Dea
Assistant Examiner—Peter D. Ferguson
Attorney—Irvin S. Thompson and Robert J. Patch

[57] ABSTRACT

A method and apparatus for the generation of frigorific energy in accordance with a cycle employing a charge of refrigerant mixture having as its main constituents a plurality of substances which are condensable in the liquid state under the operating conditions of temperature and pressure of said method, in which, during the course of a cycle, said charge is circulated under high pressure from a hot extremity to a cold extremity of a first thermal regeneration column so as to carry out a fractional condensation of said charge, one residual fraction partly in the liquid form, derived from said first regeneration column is expanded to a low pressure, and said fraction is vaporized so as to produce part of said frigorific energy; the residual fraction vaporized at the low pressure is circulated from the cold extremity to the hot extremity of a second thermal regeneration column so as to effect a fractional vaporization of part of the charge fractionally condensed during the previous cycle; and in which, during the following cycle, the direction of circulation of said charge is reversed so as to effect the fractional condensation and the fractional vaporization in said second and first regeneration columns respectively. The gaseous charge is pre-cooled before circulation, and the equipment comprises at least two thermal regeneration columns each having a permeable metallic packing which is longitudinally a poor conductor of heat.

7 Claims, 4 Drawing Figures

METHOD OF GENERATION OF FRIGORIFIC ENERGY AND A REFRIGERATOR UTILIZING SAID METHOD

The present invention relates to a method of generation of frigorific energy and a refrigerator for carrying this method into effect. The main object of the invention is directed to a refrigerator intended to supply a relatively low frigorific power — of the order of a few watts or a few multiples of ten watts — at a temperature higher than or equal to 63° K.

The known refrigerators of this kind belong to several types, for example those which utilize the Stirling cycle and the Joule-Thomson cycle. The second type necessitates very high pressures, of the order of 180 bars, and therefore requires the use of very special, costly and bulky compressors.

The refrigerators working on the basis of the Stirling cycle and other cycles such as that of Gifford McMahon, utilizing gaseous helium as a refrigerant, have the disadvantage of utilizing moving parts, in particular two pistons sliding in a cylinder, which necessitates periodic overhauls. There is also utilized the Brayton or Claude cycle which employs a turbine for the expansion, but the adjustment of this turbine has proved difficult.

An object of the invention is a refrigerator of simple, light, compact and robust construction which is however not expensive.

The starting point of the invention is the known method of cooling to low temperatures utilizing a refrigerant mixture which comprises as its main constituents a number of substances which are condensable in the liquid state under the conditions of temperature and pressure of the said method, in accordance with which the said mixture is compressed to a high pressure and is then cooled to the ambient temperature, after which a fractional condensation of the refrigerant mixture is effected, at least one of the condensed fractions is expanded to a low pressure, the said condensed fraction is vaporized and heated in heat-exchange with the refrigerant mixture in course of fractional condensation.

This method offers numerous advantages, in particular that of employing relatively moderate pressures, of the order of about 10 bars. In order to adapt this method to the type of refrigerators previously mentioned, in a refrigerator according to the invention, on the one hand the various means ensuring the fractional condensation are dispensed with, as are also the immediate expansion and introduction, with exchange of heat, of the condensed fractions into a circuit at low pressure.

This remarkable simplification of the means employed thus makes it possible to exclude the separators permitting the collection of each of the condensed fractions, the various exchangers arranged between the separators, and the expansion means associated with each condensed fraction.

This simplification is possible by employing a method comprising at least one cycle which utilizes a charge of refrigerant mixture, characterized in that, during the said cycle the said charge is circulated under high pressure from one hot extremity to a cold extremity of at least one first heat regeneration column, in order to effect a fractional condensation of the said charge, at least a residual fraction at least partly in the liquid form coming out of the first said regeneration column is expanded to a low pressure, and the said fraction is vaporized so as to produce at least part of the said frigorific energy, at least the residual fraction vaporized under the low pressure is circulated from the cold extremity to the hot extremity of at least a second heat regeneration column, in order to effect a fractional vaporization of at least a part of the charge condensed in a fractional manner during the previous cycle, and in that during the following cycle the direction of circulation of the said charge is reversed in order to effect the fractional condensation and the fractional vaporization respectively in the second and first regeneration columns.

The simplified method of a cyclic nature makes it possible on the one hand to carry out along heat regeneration columns operating on condensation and on vaporization, respectively a fractional condensation and a fractional vaporization in a practically continuous manner, thus avoiding the individual means associated with all the really fractional condensations referred to above, on the other hand by virtue of the reversal of the direction of circulation of the refrigerant mixture, leading to a change-over of the functions of condensation and vaporization of the two heat-regeneration columns, the recovery of the potential frigorific energy associated with the various condensed portions which are not directly utilized in the expansion and vaporization generators of frigorific energy.

During a cycle, the gaseous charge utilized is advantageously pre-cooled so as to obtain a liquid fraction and a gaseous fraction, after which a mixture of the gaseous fraction and at least part of the liquid fraction is circulated in a fractional condensation column. all other things being equal, this permits the thermal efficiency of the method employed to be improved.

A refrigerator according to the invention permitting the use of the previously defined method in order to produce frigorific energy, comprises at least two heat regeneration columns, each comprising a permeable heat-accumulation metallic packing which is a bad conductor of heat in a longitudinal direction of one of the said columns, a conduit connecting one extremity of a first column with an extremity of a second column and comprising a member for expansion from a high pressure to a low pressure, conduit means for coupling the other extremity of each regeneration column on the one hand to a source of the refrigerant mixture under high pressure and, on the other hand, with a source of the said mixture under low pressure, opening and closure means acting in a cyclic manner so as to cause the successive communication, first of the other extremity of the first column with the said source under high pressure and of the other extremity of the second column with the said source under low pressure, and then of the other extremity of the second column with the said source under high pressure and of the other extremity of the first column with the said source under low pressure, means for extracting the said frigorific energy in heat-exchange relation with the said conduit.

It can be seen that the production of such a refrigerator is simple, that it does not employ any moving parts at low temperature but only means for changing over the direction of circulation of the charge of refrigerant mixture at the level of the ambient temperature. The cold temperature and the energy available at the level of the extraction of the frigorific energy depend, for a given refrigerator having a specified commutation cycle, essentially on the composition, the quantity and the pressures of the refrigerant mixture employed.

The regeneration columns comprise a heat-accumulation permeable metallic packing of elongated form, arranged along the longitudinal direction of a said column, and having a good thermal conductivity in the radial direction and a low conductivity in the longitudinal direction, so as to establish a specific temperature gradient by transverse planes of the said column.

This heat-accumulation packing is constituted by a sequence of metallic masses permeable in the longitudinal direction, such as a filling of a divided metallic material (powders, balls, cuttings, filaments, etc.), separated by permeable intercalation of low heat conductivity and such that a substantial part of the condensed fraction is retained on the said masses, in particular by surface-tension forces.

The invention will now be described with reference to the accompanying drawings, in which.

Figure 1:
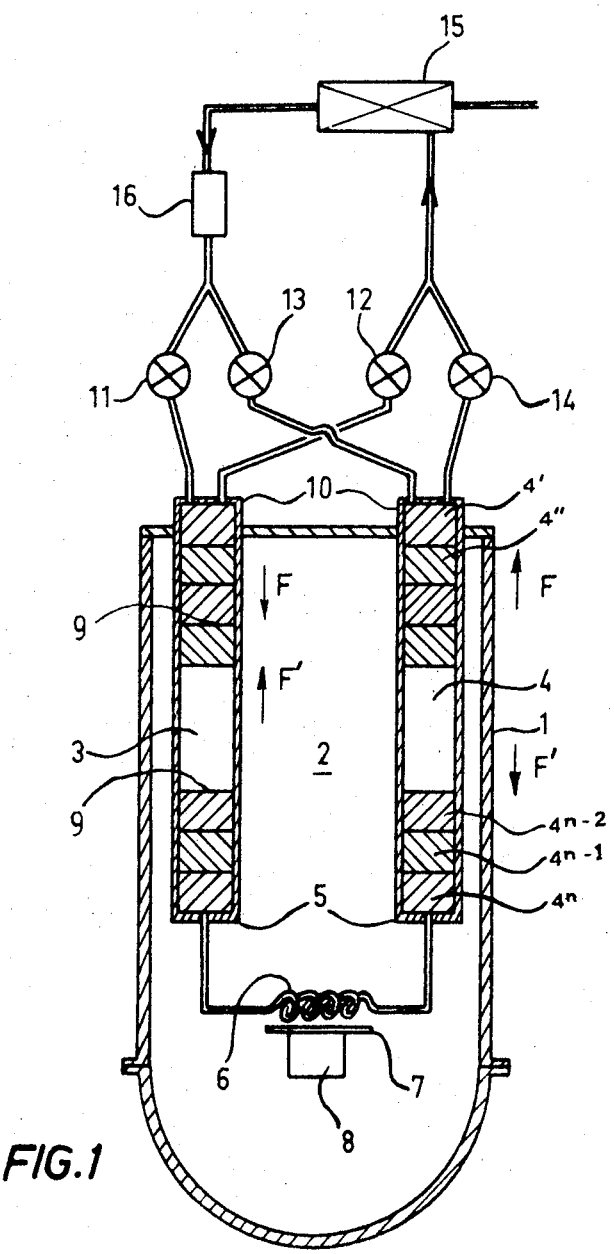
FIG. 1 represents in a diagrammatic manner a first refrigerator according to the invention.

Referring now to FIG. 1, a refrigerator according to the invention comprises, in a casing 1 enabling a heat-insulation vacuum 2 to be established, two heat-regeneration columns 3 and 4, arranged vertically and connected to each other at their lower extremities 5 by a capillary conduit 6, forming an expansion device from a high pressure to a low pressure, in heat exchange relation with a plate 7 for the extraction of the available frigorific energy, the said plate supporting an object 8 to be kept cold.

At their upper extremities 10, projecting from the exterior of the casing 1, the columns 3 and 4 are connected on the one hand to the output of a pre-cooler 16 or a source of a refrigerant mixture under high pressure, and on the other hand to the input under low pressure of a compressor 15 or a source of refrigerant mixture under low pressure.

A set of valves 11, 12, 13 and 14, cyclically actuated for opening and closure by a change-over means (not described), permits the successive communication, first of the upper extremity 10 of the first column 3 with the output of the pre-cooler 16, and the upper extremity 10 of the second column 4 with the input of the compressor 15 (closure of the valves 12 and 13) and then of the upper extremity 10 of the second column 4 with the output of the pre-cooler 16 and of the upper extremity 10 of the first column 3 with the input of the compressor 15 (closure of the valves 11 and 14).

The columns 3 and 4 are thus each connected to two valves, respectively the valves 11 and 12 for the column 3, and the valves 13 and 14 for the column 4. The valves 12 and 14 are coupled to the input of the compressor 15 (compression ratio of the order of 5 to several multiples of 10), while the valves 11 and 13 are connected to the output of the pre-cooler 16, the input of which communicates with the high-pressure output of the compressor 15.

The regeneration columns 3 and 4 are constituted by stainless steel tubes with a permeable thermal-accumulation metallic packing which is a poor conductor of heat in the longitudinal direction of one said column. For example, in accordance with FIG. 1, the metallic packing of a column 3 or 4 comprises a sequence of permeable metallic masses $4', 4'' \ldots 4^{n-2}, 4^{n-1}, 4^n$, or stacks of washers of metallic mesh, separated by permeable intercalations 9 of low heat conductivity, so as to reduce the heat conductivity of the said packing in the longitudinal direction of a said column. The mesh of the washers may be formed of phosphor bronze.

The refrigerator which has just been described operates in the following manner:

The regeneration columns 3 and 4, the opening and closure means (valves 11 to 14), the conduits connecting the upper extremities 10 of the said columns to the compressor 15 and to the pre-cooler 16, the compressor 15 and the pre-cooler 16, constituting a closed circuit, there has been placed in this latter, a charge of a refrigerant mixture comprising as its main constituents (and not as impurities) several substances condensable in the liquid state under the conditions of working of the refrigerator. This charge may comprise butane, propane, ethylene and nitrogen, and, if so desired, neon, hydrogen or helium, in proportions which may vary.

When the compressor 15, the pre-cooler 16 and the change-over means for the valves 11 to 14 are brought into action, at the end of a certain time there is established in the columns 3 and 4 a temperature gradient between their upper extremity 10 at a hot temperature and their cold extremity 5 at a cold temperature.

During a cycle of the method employed, in which the direction of circulation of the charge of refrigerant mixture is that indicated by the arrow F (column 3 under high pressure and column 4 under the low pressure of the compressor 15), the charge of refrigerant mixture in the gaseous form is pre-cooled by passing into the pre-cooler 16. The said charge is thus very partially condensed and there is obtained a liquid fraction and a gaseous fraction. There is then introduced into the column 3 a mixture of the gaseous and liquid fractions and the said charge is circulated in the two-phase form under high pressure, from the hot extremity to the cold extremity of the first heat regeneration column 3.

The fractional condensation of the charge of refrigerant mixture is thus continued. The liquid fraction is deposited on the meshes of the metallic packing of the column 3 serving as a support on which a liquid film of the said fraction adheres by the effect of surface-tension forces. The gaseous fraction constituted by the most volatile substances, is progressively engaged along the column 3, and the said gaseous fraction is subjected to gradual condensation as a function of the reduction in temperature existing from the hot upper extremity 10 towards the cold lower extremity 5 of the column 3.

At the lower extremity 5 of column 3, a residual fraction comprising a gaseous portion formed by more volatile products which cannot be condensed at the temperature and the pressure of operation of the refrigerator, and a liquid portion formed by certain less volatile liquid products which have been carried away, passes out of the regeneration column 3. This residual fraction is admitted to the capillary tube 6 in which it is subjected to an isothermal expansion to a low pressure, with vaporization, so as to produce the required frigorific energy, the latter being extracted by the plate 7 and transmitted to the object 8.

The vaporized residual fraction coming from the capillary tube 6 is introduced under low pressure into the regeneration column 4 which, at the beginning of the cycle at present described, has the same distribution (of heat and condensed products) as that obtained at the end of the said cycle in column 3. In fact, during the previous cycle, the same charge of refrigerant mixture has been condensed in a fractional manner in the regeneration column 4. In consequence, on the one hand the temperature of the lower extremity 5 is cold and that of the upper extremity 10 is hot, on the other hand, at least part of the charge condensed during the previous cycle is in the state of liquid deposits which become heavier when moving upwards in this column 4.

The residual fraction vaporized approximately at its dew point is thus caused to circulate under the low suction pressure of the compressor 15 (to within the pressure losses caused in the metallic packing of the column 4), in the second regeneration column 4, from its cold extremity 5 to its hot extremity 10. There is thus effected a fractional vaporization of the part of the charge of refrigerant mixture condensed during the previous cycle.

The vapours evolved are gradually heated and vaporize the liquids retained by surface tension on the internal packing of the column 4. This vaporization is first applied to the more volatile products at the cold or lower extremity 5, followed by decreasingly volatile products as and when the vapours rise in the column 4.

When once the greater part of these deposited products has been re-vaporized, the change-over means come into play to reverse the direction of circulation of the charge of refrigerant mixture and to cause this latter to circulate, during the following cycle, in the direction of the arrow F'. The same phenomena occur as those previously described, with this single difference that the fractionated condensation and the fractionated vaporization are respectively effected in the second column 4 and the first column 3.

There will be noted the simplicity of the apparatus described, which does not comprise any moving parts at cold temperatures, no exchanger other than the pre-cooler exchanger associated with the compressor, and no auxiliary branch circuit. The whole assembly may be effected with a small overall size and utilizing compressors with the usual compression ratios. The production of the regeneration columns also presents no difficulty, and the essential condition resides in a suitable choice of the dimensions of these columns, an appropriate choice of packing for the column, of the composition and of the mass of the refrigerant mixture and of the period of change-over or reversal.

By way of example, there has been produced a refrigerator having the following characteristics and performances:
Number of columns: 2
Column: Steel tube, internal diameter 11 mm., length 160 mm. with packing of 2,200 mesh washers in 13 packets separated by 12 washers of Teflon;
Mesh of washer: Phosphor bronze,

| | |
|---|---|
| Space factor of mesh | 69.8% |
| Thickness of wire | 30 microns |
| Density | 2.99 g/cu.cm. |
| Exchange surface volume | 466 sq.cm./CM$^3$ |
| Porosity | 0.7 |

Capillary: Diameter 0.33 mm., length from 100 to 200 mm.;
Flow-rate: 4 Nm$^3$ per hour
Pressure:
  low pressure — 1 bar absolute,
  high pressure — 15 bars absolute;
Molecular composition of the charge:

| | |
|---|---|
| $N_2$ | 47% |
| $CH_4$ | 12% |
| $C_3H_8$ | 23% |
| $C_4H_{10}$ | 12% |

Frigorific output: 10 watts
Temperature: 110° K
Reversal period: 5 seconds.

Figure 2:
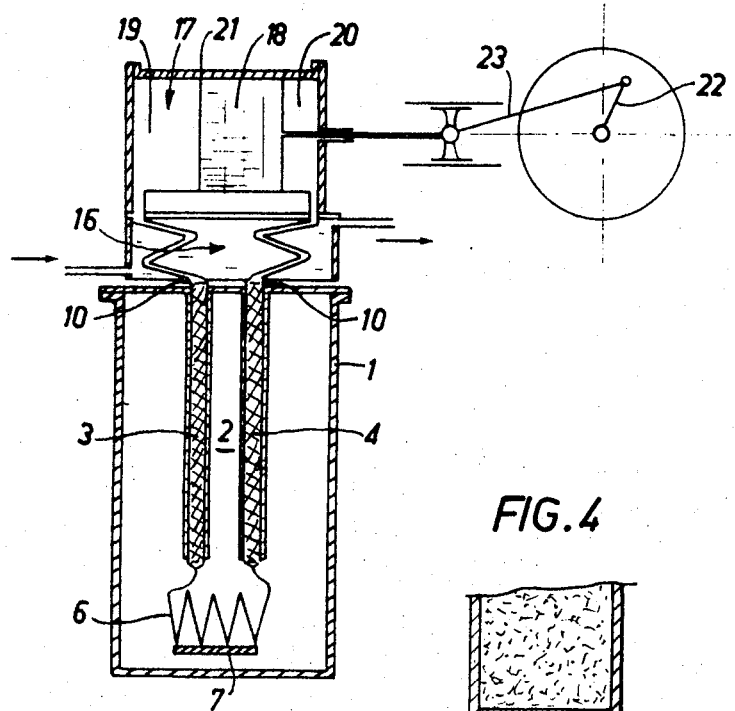
FIG. 2 represents in a diagrammatic manner a second refrigerator according to the invention.

In order to describe the refrigerator according to FIG.2, the same numerical references are employed to designate the parts already referred to in FIG.1.

A refrigerator according to FIG.2 is distinguished from that previously described by the fact that the compressor previously indicated at 15 and the opening and closure means (valves 11 to 14 as shown in FIG.1) associated with their periodic change-over means, are combined in a double-acting compressor 17. This latter comprises a piston 18 arranged in a cylinder 21, defining with this latter a first chamber 19 and a second chamber 20, situated on each side of the piston 18, directly communicating respectively with the upper extremity 10 of the first regeneration column 3 and the upper extremity 10 of the second regeneration column 4. A means constituted by a crank 22 and a crank rod 23 permits the piston 18 to move inside the cylinder 21 in a cyclically reversed manner.

By way of example, according to FIG.2, the regeneration columns 3 and 4 are constituted by a tube of 2.5 mm. in internal diameter and 100 mm. in length, comprising a packing with a metal gauze of bronze wire of 30 microns in diameter with spaces of 39 microns. The capillary tube 6 has a diameter of 0.15 mm. and a length of 1 m.

A refrigerator according to FIG.2 avoids the use of a change-over device by electro-valves for the regeneration columns 3 and 4. The reversal of the regeneration columns 3 and 4 is effect at the frequency of operation of the double-acting compressor 17.

Other solutions than that described in FIG.2 may be considered, such as two single-acting cylinders working in phase opposition.

Figure 3:
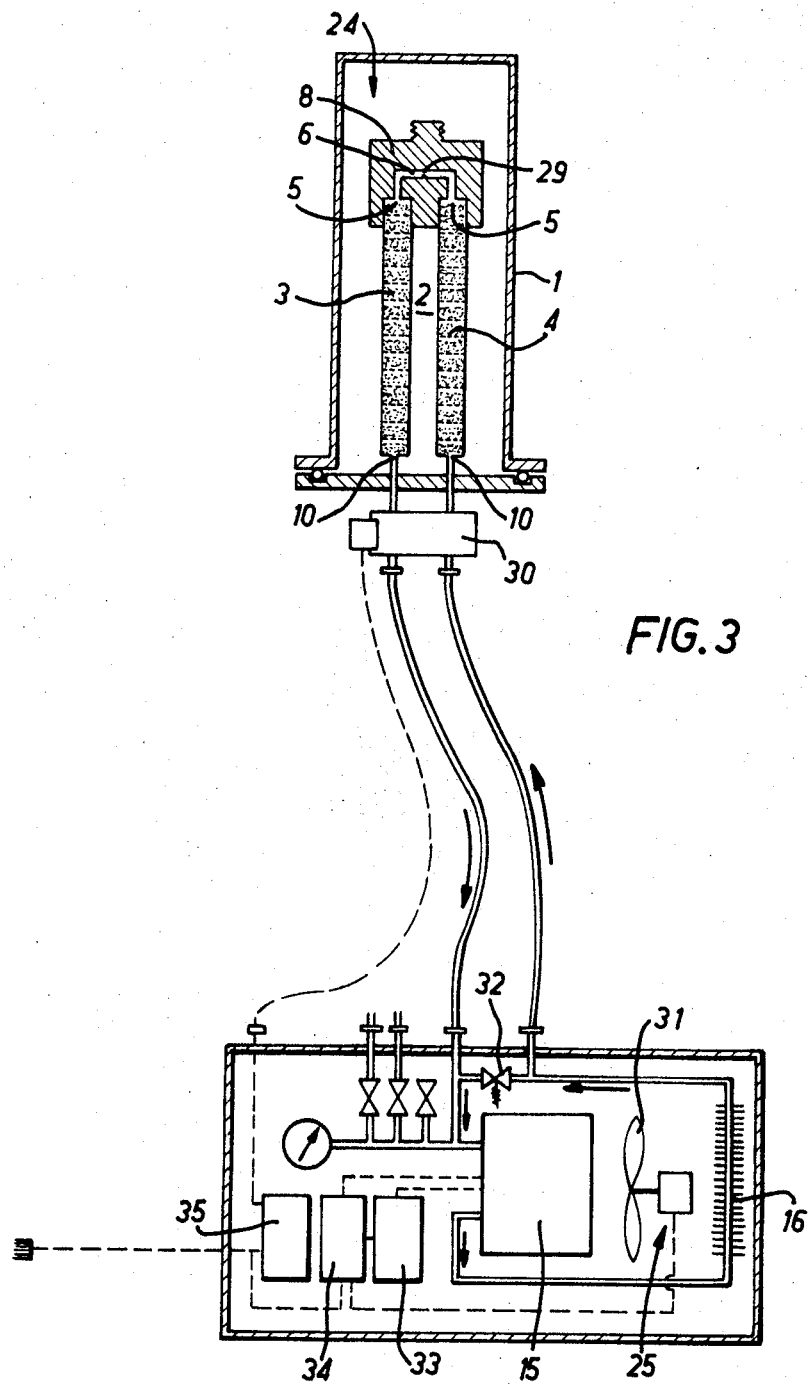
FIG. 3 represents diagrammatically a third refrigerator according to the invention.

The refrigerator shown in FIG.3 comprises two separate portions, namely a cold portion 24 constituting the refrigerator proper and a hot portion 25 comprising the compressor 15 and the pre-cooler 16.

Figure 4:
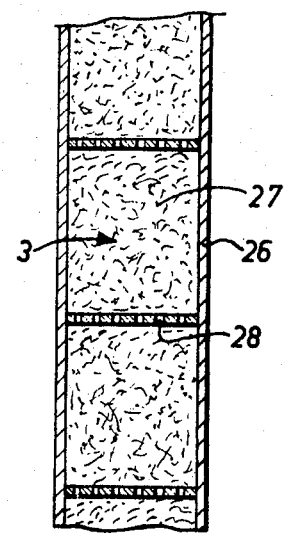
FIG. 4 shows in cross-section a part of a heat-regeneration column of the third refrigerator shown in FIG. 3.

According to FIG.4, a heat regeneration column 3 or 4 comprises a metal tube 26 filled with a permeable heat-accumulation metallic packing which is a poor conductor of heat in the longitudinal direction of the said column. This metal packing comprises a series of permeable metallic masses or fillings 27 of a divided metal material (bronze powder) separated by permeable intercalated members of low heat conductivity, or perforated washers 28 of polyamide. The metallic powder may be replaced by any similar metallic material such as balls, turnings, filaments, having a high thermal diffusion power.

The conduit 6 connecting the cold extremities 5 of the generators 3 and 4 comprises a calibrated expansion orifice 29. The conduit 6 is embedded in a copper block on which there can be fixed the sample to be cooled. At their hot extremities 10, the regenerators 3 and 4 are connected to a four-way electro-valve 30 which enables the high pressure and the low pressure to be cyclically reversed.

The compression portion 25 comprises essentially a lubricated hermetically sealed compressor 15. At the output of the compressor 15, the refrigerant mixture circulates in the gaseous state in an air pre-cooler 16, which brings the said mixture to ambient temperature. A fan 31 placed between the compressor 15 and the pre-cooler 16 enables the temperature rise of the compressor to be limited and increases the performance of the pre-cooler.

The circuit under low pressure, that is to say the suction of the compressor 15, is equipped with various auxiliary members for the conditioning, safety and control of operation of all the equipment. A valve 32 is utilized during starting-up as a by-pass between the high-pressure circuit (output of the compressor 15) and the low pressure circuit (suction of the compressor 15).

In fact, when starting-up, all the apparatus is at the ambient temperature. The flow-rate of the gaseous refrigerant mixture which can pass through the expansion orifice 29 is limited, and the compression ratio of the compressor 15 is then large. In order to prevent the compressor from working under depression at its suction, or to avoid the compressor motor being overloaded, a part of the flow-rate of the refrigerant mixture is sent directly on low pressure through the valve 32.

As the cooling of the cold portion of the refrigerator proceeds, the flow-rate through the regenerators increases and the flow through the valve 32 diminishes to zero when a permanent state is reached. The electrical operating devices for the apparatus are limited to a pressostat 33 for protecting the compressor, an electric switch box 34 for starting-up the compressor, and a timing device 18 which controls the electro-valve.

In addition to the particular advantage of the type of compressor employed, which is completely fluid-tight, very reliable and of moderate cost, it may be noted that the lubrication does not interfere in any way with the operation of the refrigerator. A quantity of lubricating oil is carried away by the refrigerant cycle mixture during its compression. However, the oil, which is nothing else than a heavy hydrocarbon, is distilled like the other constituents of the refrigerant mixture in the regenerators 3 and 4, and remains in the hot portion of these latter. In other words, the lubricating oil of the compressor 15 constitutes in this case a small part of the charge of refrigerant mixture. The lubricated compressor 15 is thus perfectly compatible with the operation of the regenerators 3 and 4, and this without any oil filtering device and without having to carry out periodical cleaning of the regenerators.

By way of example, with a refrigerator as shown in FIGS.3 and 4, utilizing a refrigerant charge comprising 10 percent of butane, 50 percent of ethane, 10 percent of methane and 30 percent of nitrogen, a low suction pressure of the compressor of 1.2 bars absolute, a high delivery pressure of the compressor of 15 bars absolute, a flow-rate of 5 Nm$^3$ per hour, it is possible to obtain a cold temperature in the vicinity of 100° K. and this can be obtained in any position of the refrigerator.

The invention described above is capable of receiving still further alternative forms:

The metallic heat-accumulation masses of the regenerators 3 and 4 may be a metallic material having a large developed surface area;

The compressor may be a dry compressor.

By dry compressor there is understood a compressor having no part in contact with the refrigerant mixture which has been in contact with a substance such as a lubricant liable to adulterate the said mixture.

What we claim is:

1. A method of generation of frigorific energy comprising a plurality of cycles employing a charge of at least one refrigerant mixture comprising a plurality of substances which are condensable to liquid under the conditions of temperature and pressure of said method, a said cycle comprising:
    a. circulating said charge under relatively high pressure from a hot extremity to a cold extremity of at least one first thermal regeneration column, whereby a fractional condensation of said charge is obtained, and retaining in said first thermal regeneration column a portion of said charge so condensed for subsequent fractional vaporization;
    b. expanding at least one residual fraction at least partly in the liquid form from said first regeneration column, to a relatively low pressure, and vaporizing said residual fraction so as to produce at least part of said frigorific energy;
    c. circulating at least said vaporized residual fraction under relatively low pressure from the cold extremity to the hot extremity of at least one second thermal regeneration column, thereby fractionally to vaporize a portion of the charge condensed and retained in said second thermal regeneration column during the previous cycle; and
    d. reversing during the following cycle the direction of circulation of said charge so as to effect the fractional condensation and the fractional vaporization respectively in said second and first regeneration columns.

2. A method as claimed in claim 1, comprising during a said cycle:
    e. precooling said charge, whereby a liquid fraction and a gaseous fraction are obtained,
    f. then circulating said gaseous fraction and at least part of said liquid fraction as a mixture in a said thermal regeneration column.

3. A refrigerator generating frigorific energy by the successive fractional condensation and fractional vaporization of a charge of a refrigerant mixture comprising a plurality of substances condensable to liquid under the conditions of operation of said refrigerator, which refrigerator comprises:
    a. at least two thermal regeneration columns each comprising heat accumulating fluid-permeable metallic adsorbent-free packing means disposed in said each column along the longitudinal direction thereof, which packing means is a poor conductor of heat in the longitudinal direction of said each column, and capable of retaining a condensed portion of said refrigerant mixture particularly by surface-tension forces;
    b. a conduit connecting one extremity of a first column with an extremity of a second column and comprising means for expansion of fluid in said conduit from relatively high pressure to relatively low pressure;

c. conduit means coupling the other extremity of each regeneration column, on the one hand to a source of said refrigerant mixture under relatively high pressure and on the other hand to a source of said refrigerant mixture under relatively low pressure;

d. opening and closure means acting in a cyclic manner to cause successive communication, first of the other extremity of said first column with said source under relatively high pressure and the other extremity of said second column with said source under relatively low pressure, and then the other extremity of said second column to said source under relatively high pressure and the other extremity of said first column with said source under relatively low pressure; and e. means for extracting said frigorific energy in heat-exchange relation with said conduit.

4. A refrigerator as claimed in claim 3, further comprising:

f. a compressor, the input of which under relatively low pressure constitutes said source of said refrigerant mixture under relatively low pressure; and g. a precooler, the input of which communicates with the output under relatively high pressure of the compressor and the output of which constitutes said source of refrigerant mixture under relatively high pressure.

5. A refrigerator as claimed in claim 3, in which the packing means of said each thermal regeneration column comprises a series of stacks of metallic mesh washers, separated by permeable intercalated members of low thermal conductivity.

6. A refrigerator as claimed in claim 3, in which the packing means of said each thermal regeneration column comprises a series of fillings of divided metallic material having a high thermal diffusion power.

7. A refrigerator as claimed in claim 4, in which said compressor is of the lubricated type, the lubricant of which constitutes a minor part of said charge of refrigerant mixture.

* * * * *